(12) United States Patent
Van Tol

(10) Patent No.: US 6,480,594 B1
(45) Date of Patent: Nov. 12, 2002

(54) SYSTEM FOR COUPLING THE PUBLIC TELEPHONE NETWORK TO THE INTERNET

(75) Inventor: Alphonsus Johannes Van Tol, Alphen A/D Rijn (NL)

(73) Assignee: Koninklijke KPN N.V. (NL)

( * ) Notice: Subject to any disclaimer, the term of this patent is extended or adjusted under 35 U.S.C. 154(b) by 0 days.

(21) Appl. No.: 09/647,018
(22) PCT Filed: Apr. 29, 1999
(86) PCT No.: PCT/NL99/00259
§ 371 (c)(1), (2), (4) Date: Sep. 26, 2000
(87) PCT Pub. No.: WO99/57872
PCT Pub. Date: Nov. 11, 1999

(30) Foreign Application Priority Data

May 6, 1998 (NL) ............................................. 1009084

(51) Int. Cl.[7] .......................... H04M 7/00; H04M 3/42; G06F 17/60; G01R 31/08
(52) U.S. Cl. ........................... 379/221.02; 379/201.05; 705/10; 370/238
(58) Field of Search .......................... 705/10; 713/201; 709/229; 370/238; 379/201.05

(56) References Cited

U.S. PATENT DOCUMENTS

| | | | |
|---|---|---|---|
| 5,995,605 A | * | 11/1999 | Madoch et al. |
| 6,081,508 A | * | 6/2000 | West et al. |
| 6,151,584 A | * | 11/2000 | Papiernaik et al. |
| 6,301,667 B1 | * | 10/2001 | Digiacomo et al. |
| 6,308,213 B1 | * | 10/2001 | Valencia |

* cited by examiner

*Primary Examiner*—Ahmad F. Matar
*Assistant Examiner*—Thjuan P. Knowlin
(74) *Attorney, Agent, or Firm*—Michaelson & Wallace; Peter L. Michaelson; Janet M. Skafar

(57) ABSTRACT

A system couples the public telephone network to the Internet using a number of Points-of-Presence, or PoPs, arranged between the public telephone network, or Public Switched Telephony Network PSTN, and an Internet Service Provider, or ISP. A Public Switched Packet Data Network (PSPDN) is arranged between a number of PoPs and a number of ISPs in such a way that a signal received by a PoP can be switched through to more than one ISP. The PoP can be chosen from the public telephone network—PSTN—using various numbers, in which the selected number determines which ISP is contacted through the PSPDN. The PSPDN for applying the system is executed such, that it is able to switch a signal received from an arbitrary PoP to one specific ISP.

8 Claims, 1 Drawing Sheet

SYSTEM FOR COUPLING THE PUBLIC TELEPHONE NETWORK TO THE INTERNET

CROSS-REFERENCE TO RELATED APPLICATIONS

Figure 1:
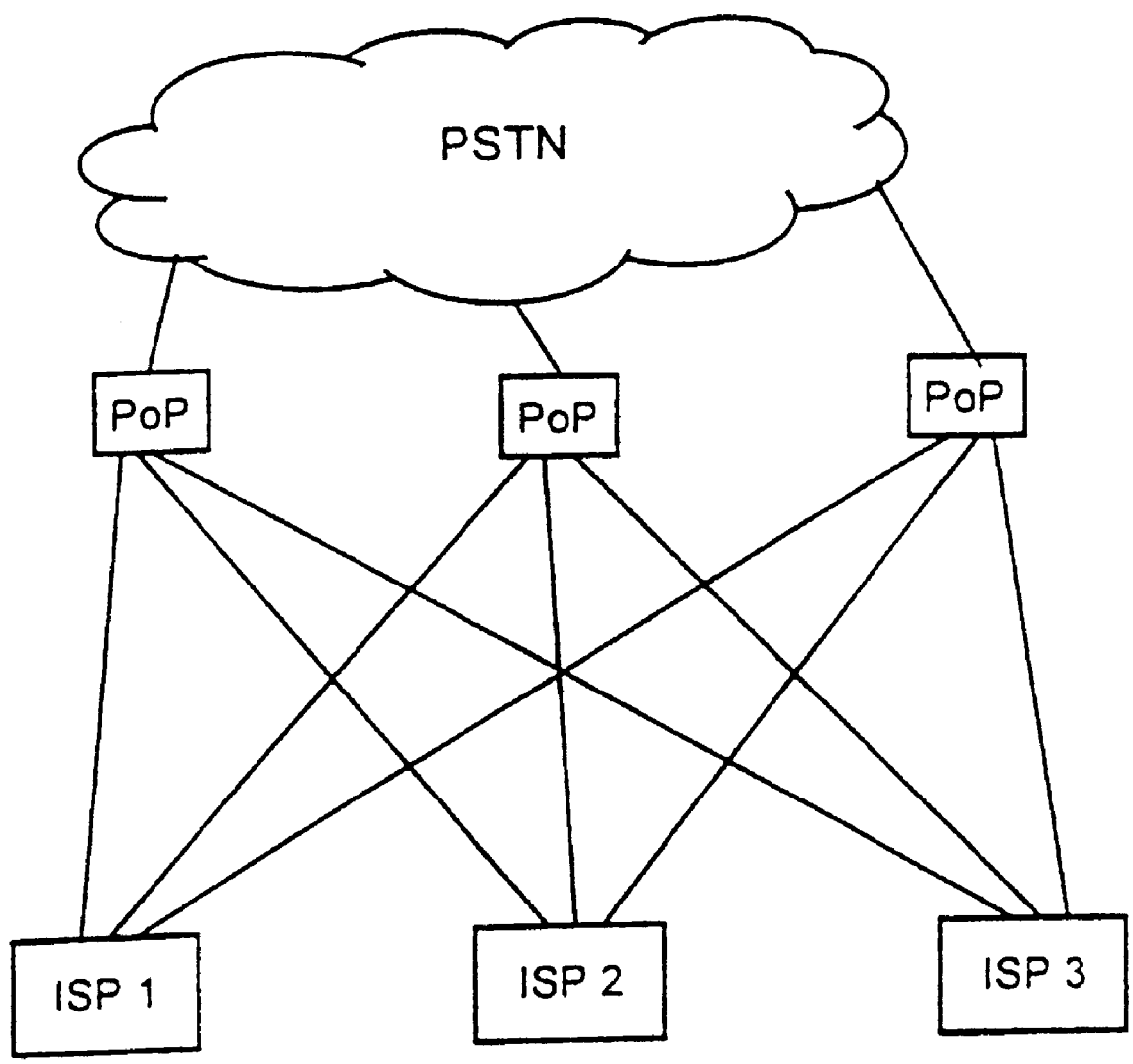

This application claims benefit to PCT International Application Number PCT/NL99/00259 filed Apr. 29, 1999, which was published in English under PCT Article 21(2).

BACKGROUND OF THE INVENTION

1. Field of the Invention

The invention relates to a system for coupling the public telephone network to the Internet using a number of Points-of-Presence, or PoPs, arranged between the public telephone network or Public Switched Telephony Network PSTN, and an Internet Service Provider, or ISP.

2. Description of the Related Art

Access to the Internet is permitted by Internet Service Providers. With the present system of coupling to the Internet, each ISP has a number of arranged PoPs.

Through the public telephone network, indicated as PSTN, an Internet user establishes a connection with a PoP of the desired ISP. Then, from the PoP the traffic is routed to the ISP concerned through a fixed connection.

When the routing is applied as described in the non-prepublished dutch patent application NL-1008259, one PoP per traffic exchange area for each ISP will suffice. Furthermore, then directly at the source it will already be known that it concerns Internet Traffic.

Necessarily, the ISP must provide for a covering network of PoPs and further rent fast connections between them and the central server. This is a relatively expensive matter, particularly for smaller ISPs.

SUMMARY OF THE INVENTION

The object of the invention is to remove this difficulty and to that end provides for, that a Public Switched Packet Data Network is arranged between a number of PoPs and a number of ISPs in such a way that a signal received by a PoP can be switched through to more than one ISP.

This means that a number of ISP's can use one single PoP, in which the signal led to a PoP will comprise an indication of which ISP the PoP is to be connected to.

Thus, the number of PoPs can be considerably reduced. Said PSPDN can be applied for all or a number of ISPs for providing the routing from a number of PoPs to it.

BRIEF DESCRIPTION OF THE DRAWING(S)

FIG. 1 is a diagram illustrating a system for coupling the public telephone network to the Internet.

DETAILED DESCRIPTION

A Public Switched Packet Data Network is arranged between a number of PoPs and a number of ISPs in such a way that a signal received by a PoP can be switched through to more than one ISP.

The PSPDN can be under the responsibility of an Internet Access Operator to be established.

If the network operator of the PSTN has chosen for a routing as described in the previously stated dutch patent application NL-1008259, then the Internet user will have to choose a number consisting of a so-called prefix, indicating that it concerns an Internet call, and a serial number being unique per ISP. He will then be connected to the ISP of his choice through a certain PoP and the PSPDN.

The nature of the connection between PSTN and POP also depends on the regulations in force. If the PoP is considered as a subscriber connection, then this should be an ISDN connection having DSS1-signalling. DSS1 is understood to mean Digital Subscriber Signalling. If, on the other hand, the PoPs are considered as another network, then the connection should take place in the way standard networks of other operators are connected, as e.g. according to Q.767 or Q.763.

The outgoing router of a PoP will be connected to the PSPDN by at least a 2 Mb link.

A PoP manager can be added to the PoPs described. This is a PC directly adjacent the PoP or at a distance from it, controlling a number of PoPs and performing the following functions:

a) configuration management: management of the tables for conversion of telephone numbers into IP addresses;

b) error management: indicating and recording errors in the connections to the PSTN and to the ISPs;

c) performance management: monitoring the load of the PoPs for timely enhancement of the capacity; and d) accounting management: recording the use of the PoP itemized per ISP in order to be able to charge the costs in proportion.

The invention is further explained by way of a diagram illustrated in the accompanying figure (FIG. 1).

Therein, PSTN—Public Switched Telephony Network—stands for the public telephone network, PoP stands for a number of Points-of-Presence, PSPDN stands for Public Switched Packet Data Network and ISP 1, 2, 3 indicate some Internet Service Providers.

As illustrated in the diagram, a number of PoPs is coupled to the PSPDN which in turn is coupled to a number of ISPs. A PoP leads signal received from the PSTN to the PSPDN and from there further to the desired ISP. Thus, the signal received by a PoP can not, as is the case up to now, be forwarded to only one single ISP, but to a preselected ISP.

Obviously, the invention also relates to a Public Switched Packet Data Network—PSPDN—capable of connecting a signal received from an arbitrary PoP to one specific ISP.

It will be obvious, that only one possible embodiment of a system according to the invention has been illustrated in the drawing and described above and that many changes can be made without leaving the inventive idea, as it is indicated in the accompanying claims.

What is claimed is:

1. System for coupling the public telephone network to the Internet using a number of Points-of-Presence, or PoPs, arranged between the public telephone network, or Public Switched Telephony Network PSTN, and an Internet Service Provider, or ISP, characterized in that a Public Switched Packet Data Network, or PSPDN, is arranged between a number of PoPs and a number of ISPs, in such a way that a signal received by a PoP can be switched through to more than one ISP.

2. System according to claim 1, characterized in that the PoP can be chosen from the public telephone network—PSTN—using various numbers, in which the selected number determines which ISP is contacted through the PSPDN.

3. The system as recited in claim 1 further comprising a PoP manager controlling at least part of said number of PoPs.

4. The system as recited in claim 1 wherein a signal received by a PoP is switched through to one specific ISP.

5. System for coupling the public telephone network to the Internet using a number of Points-of Presence, or PoPs, arranged between the public telephone network, or Public Switched Telephony Network PSTN, and an Internet Service Provider, or ISP, characterized in that a Public Switched Packet Data Network or PSPDN, is arranged between a number of PoPs and a number of ISPs, in such a way that a signal received by a PoP can be switched through to a preselected ISP.

6. The system according to claim 5, characterized in that the PoP can be chosen from the public telephone network—PSTN—using various numbers, in which the selected number determines which ISP is contacted through the PSPDN.

7. The system as recited in claim 5 wherein a signal received by a PoP is switched through to one specific ISP.

8. The system as recited in claim 5 further comprising a PoP manager controlling at least part of said number of PoPs.

* * * * *